UNITED STATES PATENT OFFICE.

ISAAC LIFSCHÜTZ, OF HAMBURG, GERMANY.

PROCESS OF OBTAINING WAX-LIKE SUBSTANCES FROM LANOLIN.

1,252,591.

Specification of Letters Patent. Patented Jan. 8, 1918.

No Drawing. Application filed November 3, 1914. Serial No. 870,042.

*To all whom it may concern:*

Be it known that I, ISAAC LIFSCHÜTZ, a subject of the German Emperor, and residing at Hamburg, Germany, have invented certain new and useful Improvements in the Processes of Obtaining Wax-like Substances from Lanolin, of which the following is a specification.

My invention relates to improvements in the process of obtaining wax like substances from lanolin, and the products obtained thereby, and the object of the improvements is to provide a process whereby the wax like substances are directly obtained from the lanolin. With this object in view my invention is based on the fact that the solubility of the fatty acids as such (or in the form of alkaline soaps), and the alcohols of the same, in alcohol such as wood alcohol and spirit (or other solvents which can be mixed with water), and the melting points are almost universally at the inverse ratio. For example lanocerin acid, which has a melting point of 104 degrees centigrade, or the alkali salt of lanoceric acid and the solid cholesterins, which have melting points of 145 and 137 degrees centigrade, respectively, are not all or in a slight degree only soluble in spirits of from 60 to 70%, while oleic acid, which has a melting point of 15 degrees centigrade, or the alkaline soaps of the same, and the soft "cholesterin fraction 2c" *Berichte der Deutschen Chemischen Gesellschaft*, vol. 31 (1898), pp. 1122 and 1123, are most easily soluble.

Therefore by saponifying or splitting the lanolin and sufficiently washing the product with spirits at ordinary temperature the easily soluble and the liquid substances enter into the solution, while the difficultly soluble wax like substances remain in the form of a solid crystalline pulp, and after removing the spirits and separating the acid part contained therein a light-yellow wax like product is obtained which melts at a temperature of from 65 to 68 degrees centigrade. The larger part of the said substance consists of the alcohols and fatty acids of the lanolin which have higher melting points.

In order that my invention be more clearly understood I shall now describe an example for putting the process into effect.

1000 kilograms of raw acid or neutral lanolin of the trade are saponified or hydrolyzed by any known or preferred method. For instance the saponification or hydrolyzing (decomposing) may be obtained by treating with alcoholic alkali. This saponification or hydrolyzing of the woolfat is not a substantial part of the process described and is well known to the experts, so a specification thereof is not needed, it is sufficient to state that the saponification or hydrolyzing has to be complete. The product of the reaction is filled into a suitable washing receptacle and washed therein at ordinary temperature by means of spirits of from 60 to 70%. After washing the product until the liquid which flows off is as clear as the liquid which flows in, a solid white pulp is obtained to which an equal amount of water having a sufficient amount of mineral acid admixed thereto is added, whereupon the whole mass is heated until the spirits has been distilled off. The amount of mineral acid required is found out by ascertaining in a specimen of the product of the saponification the alkali contained therein and by calculating therefrom the equivalent quantity of the mineral acid. After shortly clearing the mass the water is withdrawn and the molten waxlike mass is filled in molds, if desired after cleaning the same with reference to color and odor. Thereby after cooling a light yellow odorless wax like mass is obtained which when broken resembles carnauba wax and as to the melting point and the kneading properties it resembles the bees wax.

As will be understood from the nature of the process by using stronger spirits, products of higher melting points can be obtained.

The output in wax is, according to the raw material, from 35 to 40% of the raw acid lanolin and from 45 to 50% of the raw neutral lanolin.

From the spirituous washing lyes lanolin acids can be produced, as is known in the art. Thereby the residue of the raw material is utilized without any loss.

A modification of the process consists in separating the product directly after saponifying, or otherwise splitting, the material, by an acid, or separating the same from another splitting medium, and washing the separated product by means of spirits or wood alcohol. The pulp which remains as a residue is treated in the same way as has been described above, and from the washing lyes similar products can be obtained as in the example described above.

As compared to known processes my improved process is preferable for the following reasons:

(1.) A single solvent is used. Exclusively spirit in a diluted state is used as a solvent and washing medium.

(2.) A uniform wax like product is obtained which has a high melting point. The output is high, and the process consists of a single operation and not of fractional operations.

(3.) As the steps of the process are simple little space is required. The lanolin is split only in two products, one of which, that is the wax, has a high commercial value, while the other product, that is the lanolin acid, is more valuable than the raw material (the lanolin).

Ordinarily the product of my improved process consists of the fatty acids and alcohols which have high melting points, which product is very similar to the natural wax in so far as it can easily be saponified. In this respect my improved process and product are distinguished from known processes and products in which without exception the products of the splitting operation of the lanolin are perfectly separated into technically pure fatty acids and alcohols.

At present large quantities of lanolin are supplied to the market, which largely exceed the demand. Therefore my improved process is of high commercial value, because from a raw material of comparatively low cost valuable products are obtained.

I claim herein as my invention:

1. The herein described method, which consists in saponifying or hydrolyzing woolfat, and then washing the same at ordinary temperature with an alcohol soluble in water for separating therefrom the parts soluble thereby, until the residue results in a solid waxlike product.

2. The herein described method which consists in saponifying or hydrolyzing woolfat and then separating therefrom, by means of washing the saponified or hydrolyzed product with an alcohol soluble in water,— the part which at ordinary temperature is soluble therein, until the solid residue results in a waxlike product.

3. The herein described method which consists in saponifying or hydrolyzing woolfat, washing the saponified or hydrolyzed material with an alcohol soluble in water until the solid residue results in a waxlike product, and treating the alcoholic filtrate by some suitable method to obtain the fatty acids dissolved therein.

4. The herein described light yellow waxlike product having a melting point above 50° C.=120° F. and consisting of high melting fatty acids and alcohols of woolfat.

In testimony whereof I hereunto affix my signature in the presence of two witnesses.

Dr. ISAAC LIFSCHÜTZ.

Witnesses:
 WILLY JACOBSOHN,
 THADDAEUS S. MICTOWSKI.